US012658689B2

(12) United States Patent
Takao et al.

(10) Patent No.: US 12,658,689 B2
(45) Date of Patent: Jun. 16, 2026

(54) MOTOR CONTROL DEVICE AND MOTOR CONTROL METHOD

(71) Applicant: TMEIC Corporation, Tokyo (JP)

(72) Inventors: Kenshi Takao, Tokyo (JP); Shunsuke Tobayashi, Tokyo (JP)

(73) Assignee: TMEIC Corporation, Tokyo (JP)

( * ) Notice: Subject to any disclaimer, the term of this patent is extended or adjusted under 35 U.S.C. 154(b) by 186 days.

(21) Appl. No.: 18/290,684

(22) PCT Filed: Mar. 18, 2022

(86) PCT No.: PCT/JP2022/012568
§ 371 (c)(1),
(2) Date: Jan. 19, 2024

(87) PCT Pub. No.: WO2023/175885
PCT Pub. Date: Sep. 21, 2023

(65) Prior Publication Data
US 2024/0332950 A1     Oct. 3, 2024

(51) Int. Cl.
G05B 5/00          (2006.01)
H02H 1/00          (2006.01)
H02H 7/08          (2006.01)

(52) U.S. Cl.
CPC ............ H02H 7/08 (2013.01); H02H 1/0007 (2013.01)

(58) Field of Classification Search
CPC .. H02H 7/08; G05B 9/02; H02P 27/06; H02P 29/028; H02P 29/0241; H02P 29/00
See application file for complete search history.

(56) References Cited

U.S. PATENT DOCUMENTS

2012/0229946 A1     9/2012   Shirakawa et al.
2016/0294385 A1    10/2016   Vazach et al.

FOREIGN PATENT DOCUMENTS

JP          63-1321  A        1/1988
WO     WO-2011065536 A1 *    6/2011    ............... H02H 3/20

OTHER PUBLICATIONS

Extended European Search Report issued Mar. 28, 2025, in corresponding European Patent Application No. 22932158.3, 11 pages.

* cited by examiner

*Primary Examiner* — Karen Masih
(74) *Attorney, Agent, or Firm* — Knobbe, Martens, Olson & Bear, LLP

(57) ABSTRACT

A motor control device includes a signal identifying unit and an overvoltage detecting unit. The signal identifying unit includes an optical isolator that converts an electrical signal supplied via a terminal to which an external device is connected and a switch that turns off a connection circuit connected to the terminal. The overvoltage detecting unit is configured to turn off the switch when a voltage applied to the connection circuit is greater than a threshold voltage.

9 Claims, 5 Drawing Sheets

MOTOR CONTROL DEVICE AND MOTOR CONTROL METHOD

TECHNICAL FIELD

An embodiment of the present invention relates to a motor control device and a motor control method.

BACKGROUND ART

Functional safety requirements in a speed-adjustable electric drive system (simply referred to as a drive system) include requirements for switching an operating state of an electric motor to a safety torque off (STO) state in accordance with a safety stop command which is supplied from a host controller to a motor control device. For example, the motor control device configured to be supplied with a safety stop command signal from an external device or a functional module identifies the safety stop command signal using a signal identifying unit thereof. There is demand for enhancing overvoltage resistance of the signal identifying unit that identifies such a signal associated with functional safety.

CITATION LIST

Patent Document

[Patent Document 1]
  Japanese Unexamined Patent Application, First Publication No. 1988-001321

SUMMARY OF INVENTION

Technical Problem

An objective of the present invention is to provide a motor control device and a motor control method that can enhance overvoltage resistance of a signal identifying unit configured to identify a signal associated with functional safety.

Solution to Problem

A motor control device according to an aspect of an embodiment includes a signal identifying unit and an overvoltage detecting unit. The signal identifying unit includes an optical isolator that converts an electrical signal supplied via a terminal to which an external device is connected and a switch that opens a connection circuit connected to the terminal. The overvoltage detecting unit is configured to turn off the switch when a voltage applied to the connection circuit is greater than a threshold voltage.

BRIEF DESCRIPTION OF DRAWINGS

FIG. 3 is a diagram illustrating a configuration of an STO signal input circuit portion included in an interface portion according to the embodiment.

FIG. 4 is a diagram illustrating an STO signal in the configuration illustrated in FIG. 3.

DESCRIPTION OF EMBODIMENTS

Hereinafter a motor control device and a motor control method according to an embodiment will be described with reference to the accompanying drawings. In the following description, elements having the same or similar functions will be referred to by the same reference signs. Repeated description of the elements may be omitted. Electrical connection may be simply referred to as "connection." A safety controller is an example of a host device that controls functional safety of the motor control device.

A main circuit of the motor control device is made to be redundant, for example, such that a drive system described in this embodiment can be applied to a system with relatively high demand for availability. An example in which one or both of standby redundancy and capacity redundancy are applied as an example of the redundancy of the main circuit will be described below. Standby redundancy is a method of switching a motor control device with a drive system with a configuration including a plurality of banks, in which when the motor control device of a specific bank in an active system breaks down, a bank in a standby system of the motor control device is switched to the active system to continue operation of the drive system. A configuration in which one bank is set as the standby system is exemplified herein. Capacity redundancy is a method of setting a suppliable capacity to have a margin with respect to a necessary capacity of AC electric power and continuously operating the drive system to secure the necessary capacity by continuously operating the drive system with a remaining configuration even when a defective part is excluded.

In the drive system according to the embodiment, it is necessary to switch an operating state of an electric motor to a safety torque off (STO) state in accordance with a safety stop command supplied from a host controller to the motor control device without using the method of the redundant configuration.

First Embodiment

Figure 1A:
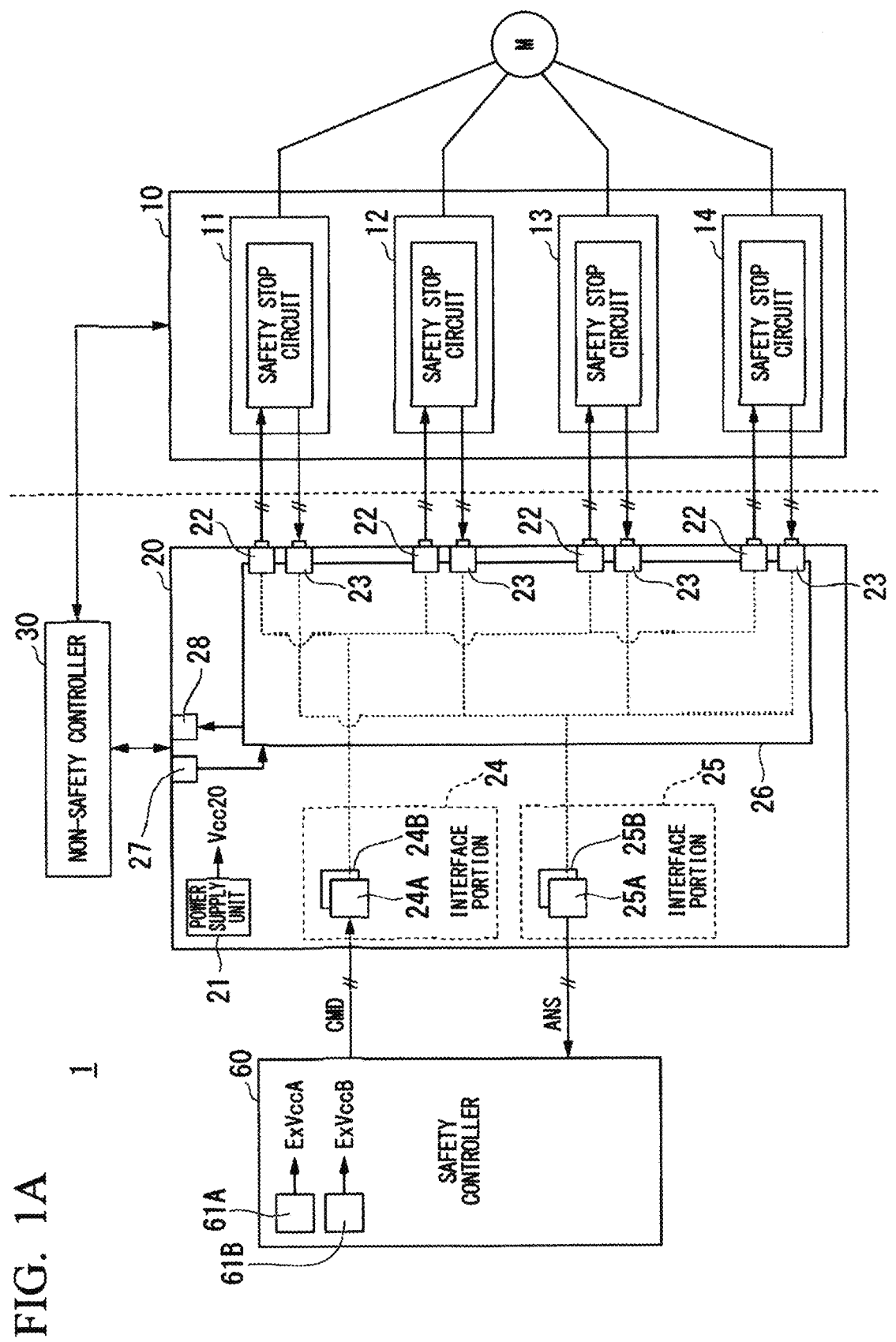
FIG. 1A is a diagram schematically illustrating a drive system including a motor control device according to an embodiment.
Figure 1B:
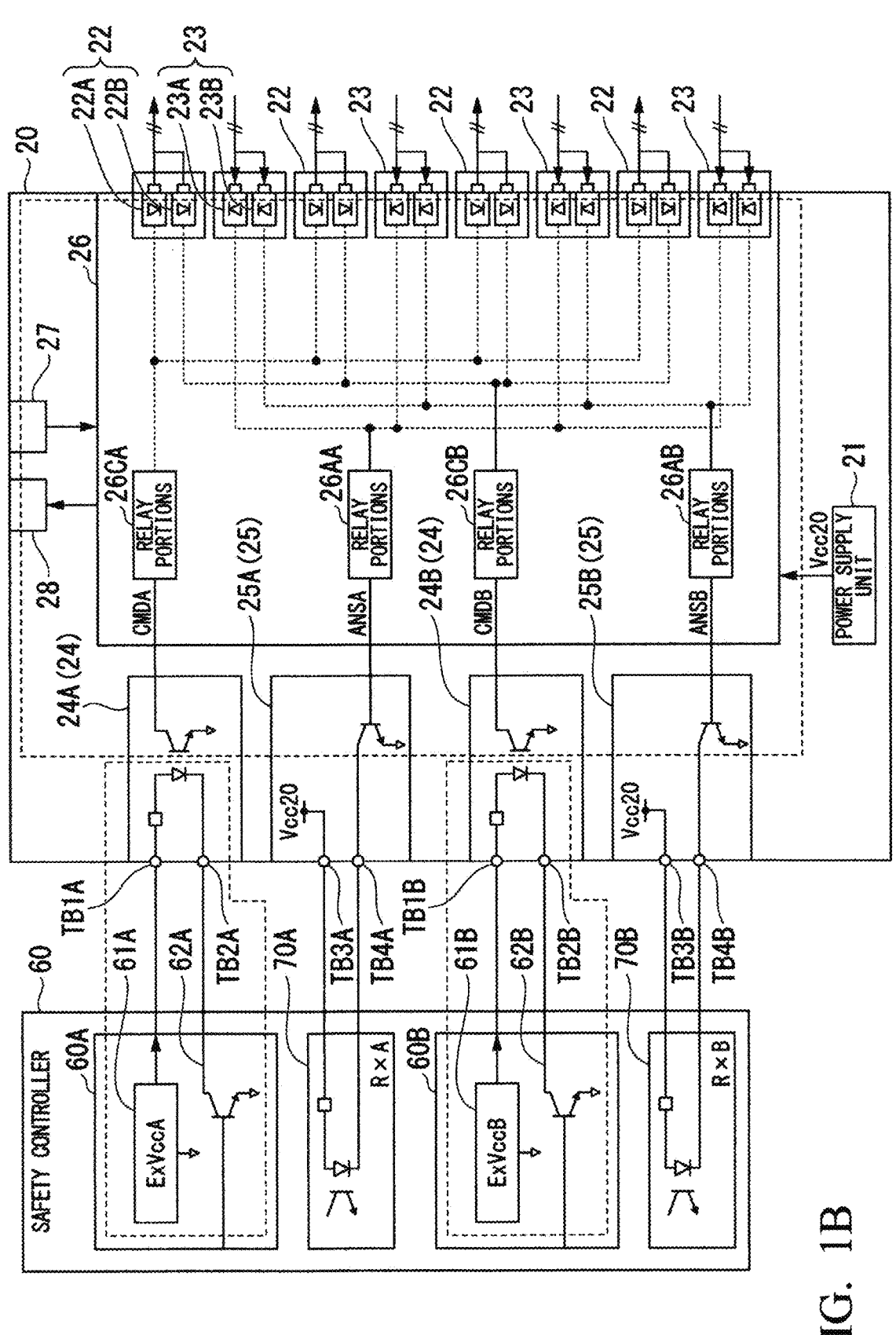
FIG. 1B is a diagram schematically illustrating a relationship between a relay unit and a safety controller according to the embodiment.

FIG. 1A is a diagram schematically illustrating a drive system 1 including a motor control device according to an embodiment. FIG. 1B is a diagram schematically illustrating a relationship between a relay unit 20 and a safety controller 60 according to the embodiment.

The drive system 1 illustrated in FIG. 1A includes, for example, motor control devices 11 to 14, a relay unit 20, a non-safety controller 30, and a safety controller 60.

Each of the motor control devices 11 to 14 includes, for example, one or more switching elements which are not illustrated and converts electric power by switching the switching elements. Types of the switching elements may include an insulated gate bipolar transistor (IGBT), an injection enhanced gate transistor (IEGT), and a metal-oxide-semiconductor field-effect transistor (MOSFET). The motor control device 11 is an example of a first motor control device. The motor control devices 12 to 14 are examples of one or more second motor control devices. In the following description, the motor control devices 11 to 14 which are an example of a plurality of motor control devices may be simply referred to as motor control devices 10 when they are not distinguished. Each motor control device 10 serves as an inverter that generates AC electric power under the control and causes a current to flow in a winding of an electric motor M connected to an output thereof.

The motor control devices 10 are divisionally configured as a plurality of banks. For example, the drive system 1 controls operating states of the motor control devices 10 for each bank. For example, the drive system 1 performs switching of redundancy control for each bank. The number of banks in the drive system 1 can be set, for example, to one of 1 to 4. For example, the number of banks is determined by required specifications of the drive system 1. In the following description, it is assumed that the maximum number of banks in the embodiments is set to 4.

The relay unit 20 relays signals of the non-safety controller 30 and the safety controller 60. For example, the motor control devices 10 are provided downstream from the relay unit 20. The non-safety controller 30 and the safety controller 60 are provided upstream from the relay unit 20. At least the safety controller 60 is disposed upstream from the relay unit 20. The relay unit 20 relays control for the motor control devices 10 from the non-safety controller 30 and the safety controller 60. The relay unit 20 relays states of the motor control devices 10 to the non-safety controller 30 and the safety controller 60.

The non-safety controller 30 performs, for example, capacity redundancy control of the motor control devices 10 and standby redundancy control of the motor control devices.

The safety controller 60 will be described later.

The relay unit 20 includes, for example, a power supply unit 21, interface portions 24, 25, 27, 28, and a relay circuit 26.

The power supply unit 21 includes a stabilized power supply circuit. The power supply unit 21 steps down a source voltage to a predetermined voltage Vcc20 and supplies DC electric power with the voltage Vcc20 to constituents of the relay unit 20. The power supply unit 21 monitors an input voltage and an output voltage thereof and stops the relay unit 20 when an abnormality in the voltages has been detected. Through this stop, supply of an operation command to the motor control devices 10 from the relay unit 20 is stopped and a signal state from the relay unit 20 to the safety controller 60 is switched to a state indicating stop of an electric motor. The power supply unit 21 and peripherals thereof can be configured such that such fail-safe requirements are satisfied.

The interface portions 27 and 28 are provided as a pair and form an interface portion for the non-safety controller 30. The interface portion 28 transmits a signal to the non-safety controller 30. The interface portion 27 receives a signal from the non-safety controller 30.

The relay unit 20 includes, for example, an A-system circuit (not illustrated) and a B-system circuit (not illustrated) which are redundant. The interface portion 24 and the interface portion 25 are divisionally provided in the A-system circuit and the B-system circuit for each system.

As illustrated in FIG. 1B, the relay circuit 26 includes a plurality of interface portions 22 and 23 and relay portions 26CA, 26AA, 26CB, and 26AB.

The plurality of interface portions 22 and 23 are provided as a pair and are connected to the motor control devices 10. Each pair of the interface portions 22 and 23 forms an interface portion for each bank of the motor control devices 10. The connection mode illustrated in FIGS. 1A and 1B is an example of 1:1 connection and the topology of the connection mode is not limited thereto.

For example, each interface portion 22 outputs a signal for the corresponding motor control device 10. More specifically, each interface portion 22 includes an interface portion 22A for the A-system circuit and an interface portion 22B for the B-system circuit. Only one system from the interface portion 22A for the A-system circuit and the interface portion 22B for the B-system circuit is referred to by signs, but the other system is the same.

Each interface portion 23 receives a signal from the corresponding motor control device 10. More specifically, each interface portion 23 includes an interface portion 23A for the A-system circuit and an interface portion 23B for the B-system circuit. The interface portion 23A for the A-system circuit and the interface portion 23B for the B-system circuit are referred to by signs of only one system, but the same is true of the other system.

Each interface portion 25 transmits a signal to the safety controller 60. Each interface portion 24 receives a signal from the safety controller 60.

The relay circuit 26 is connected to the interface portions 24, 25, 27, and 28 in the relay unit 20.

The relay circuit 26 receives signals supplied from the safety controller 60 to the interface portion 24 using the relay portions 26CA and 26CB for each system. The relay portions 26CA and 26CB relay the signals to the motor control devices 10 via the corresponding interface portions 22 for each system.

The relay circuit 26 receives signals associated with safety control supplied from the motor control devices 10 via the corresponding interface portions 23 using the relay portions 26AA and 26AB for each system. The relay portions 26AA and 26AB relay the received signals associated with safety control to the corresponding interface portions 25 for each system.

The relay circuit 26 relays a system selection signal received by the interface portion 27 to the motor control devices 10 via the corresponding interface portions 22 and relays a system operating state signal associated with non-safety control received from the motor control devices 10 via the corresponding interface portions 23 to the interface portion 28.

The interface portion 24 includes an STO signal input circuit portion 24A and an STO signal input circuit portion 24B.

The STO signal input circuit portion 24A includes, for example, terminals TB1A and TB2A to which an external device is connected. The terminal TB1A is connected to an output of a safety control output circuit 60A which will be described later. The terminal TB2A is connected to the output of the safety control output circuit 60A which will be described later. The terminal TB2A is connected to an output of a signal output unit 62A which will be described later.

The STO signal input circuit portion 24B includes, for example, terminals TB1B and TB2B to which an external device is connected. The terminal TB1B is connected to an output of a safety control output circuit 60B which will be described later. The terminal TB2B is connected to the output of the safety control output circuit 60B which will be described later. The terminal TB2B is connected to an output of a signal output unit 62B which will be described later.

The interface portion 25 includes an A-system output circuit 25A and a B-system output circuit 25B.

The A-system output circuit 25A includes, for example, terminals TB3A and TB4A to which an external device is connected. The terminal TB3A is connected to a first input terminal of a detection circuit 70A which will be described later. The terminal TB2B is connected to a second input terminal of the detection circuit 70A.

The B-system output circuit 25B includes, for example, terminals TB3B and TB4B to which an external device is connected. The terminal TB3B is connected to a first input terminal of a detection circuit 70B which will be described later. The terminal TB4B is connected to a second input terminal of the detection circuit 70B.

For example, the STO signal input circuit portion 24A and the A-system output circuit 25A in the relay unit 20 are interface circuits corresponding to the A-system circuit. The STO signal input circuit portion 24A and the A-system output circuit 25A are provided as a pair and form an interface portion for the safety controller 60.

The STO signal input circuit portion 24B and the B-system output circuit 25B in the relay unit 20 are interface circuits corresponding to the B-system circuit. The STO signal input circuit portion 24B and the B-system output circuit 25B are provided as a pair and form an interface portion for the safety controller 60.

The safety controller 60 includes, for example, a safety control output circuit 60A and a detection circuit 70A for the A-system circuit and a safety control output circuit 60B and a detection circuit 70B for the B-system circuit which are redundant. A group of the safety control output circuit 60A and the detection circuit 70A for the A-system circuit and the group of the safety control output circuit 60B and the detection circuit 70B for the B-system circuit have the same configuration except for identification setting of a redundancy system. In the following description, the safety control output circuit 60A and the detection circuit 70A for the A-system circuit will be exemplified. Description of the safety control output circuit 60A and the detection circuit 70A for the A-system circuit may be referred to below for the safety control output circuit 60B and the detection circuit 70B for the B-system circuit.

For example, the detection circuit 70A outputs a signal transmitted from the A-system output circuit 25A of the interface portion 25 to the safety controller 60. The detection circuit 70A includes, for example, a photo coupler and isolates the interface portion 25 from an internal circuit of the detection circuit 70A using the photo coupler.

The safety control output circuit 60A includes, for example, a power supply unit 61A and a signal output unit 62A.

The power supply unit 61A supplies a voltage ExVccA to the inside of the safety control output circuit 60A and the STO signal input circuit portion 24A of the interface portion 24. A current which is caused to flow in the STO signal input circuit portion 24A by the power supply unit 61A includes a current for sending a signal output from the signal output unit 62A.

For example, the signal output unit 62A includes an open-collector drive circuit. The signal output unit 62A absorbs a current returning from the STO signal input circuit portion 24A when an output impedance of the drive circuit is low. The signal output unit 62A cuts off a current returning from the STO signal input circuit portion 24A when the output impedance of the drive circuit is high.

The safety control output circuit 60A generates an operation command CMD for performing functional safety control of the motor control devices 10 and transmits the operation command CMD to the STO signal input circuit portion 24A. The safety control output circuit 60A transmits the operation command CMD using a pulse string of a current. For example, the pulse string can be prescribed to indicate operation when the photo coupler of the STO signal input circuit portion 24A is turned on (make) and to indicate stop when it is turned off (break).

The STO signal input circuit portion 24A reproduces the pulse string output from the safety control output circuit 60A when the pulse string of a current as the operation command CMD is detected.

The power supply unit 61B supplies a voltage ExVccB to the inside of the safety control output circuit 60B and the STO signal input circuit portion 24B of the interface portion 24. A current which is caused to flow in the STO signal input circuit portion 24B by the power supply unit 61B includes a current for sending a signal output from the signal output unit 62B.

The safety control output circuit 60B generates an operation command CMD for performing functional safety control of the motor control devices 10 and transmits the operation command CMD to the STO signal input circuit portion 24B. The safety control output circuit 60B transmits the operation command CMD using a pulse string of a current.

The STO signal input circuit portion 24B reproduces the pulse string output from the safety control output circuit 60B when the pulse string of a current as the operation command CMD is detected. Similarly to the safety control output circuit 60A, the pulse string can be prescribed to indicate operation when the photo coupler of the STO signal input circuit portion 24B is turned on (make) and to indicate stop when it is turned off (break).

The safety controller 60 performs functional safety control of the motor control devices 10 to reduce a risk which may occur while the motor control devices 10 are operating. The safety controller 60 generates the operation commands CMD using electric power of the power supply units 61A and 61B and controls output states of the motor control devices 10 in accordance with the operation commands CMD. For example, the safety controller 60 may be configured to receive answer signals ANS from the motor control devices 10 and to monitor an operating state of functional safety control in response to the operation commands CMD.

Existing methods may be employed as methods for distribution of the operation commands CMD from the safety controller 60 to the motor control devices 10 and collection of the answer signals ANS from the motor control devices 10 to the safety controller 60 which are performed by the relay circuit 26 of the relay unit 20. For example, the safety controller 60 may individually send the operation commands CMD for the motor control devices 10 and the relay unit 20 may relay and distribute the operation commands. Instead, the safety controller 60 may send the operation commands CMD for the motor control devices 10 together and the relay circuit 26 of the relay unit 20 may distribute and relay the operation commands. The safety controller 60 may individually receive the answer signals ANS from the motor control devices 10 or may receive an answer signal which is multiplexed or logically combined by the relay circuit 26 of the relay unit 20. The relay unit 20 constitutes a part of a safety stop circuit.

In the drive system 1 having the aforementioned configuration, the operating state of each motor control device 10 is determined under the control of the non-safety controller 30 and the safety controller 60. Switching control of the switching elements in each motor control device 10 is determined under the control of the non-safety controller 30. In addition, the outputs of the motor control devices 10 may be restricted under the control of the safety controller 60. The drive system 1 converts a desired amount of electric power and drives the electric motor M by operating a plurality of redundant motor control devices 10 in combination.

Details of the constituents of the drive system 1 will be sequentially described below.

A motor control device 10 according to an embodiment will be described below with reference to FIG. 2.

Figure 2:
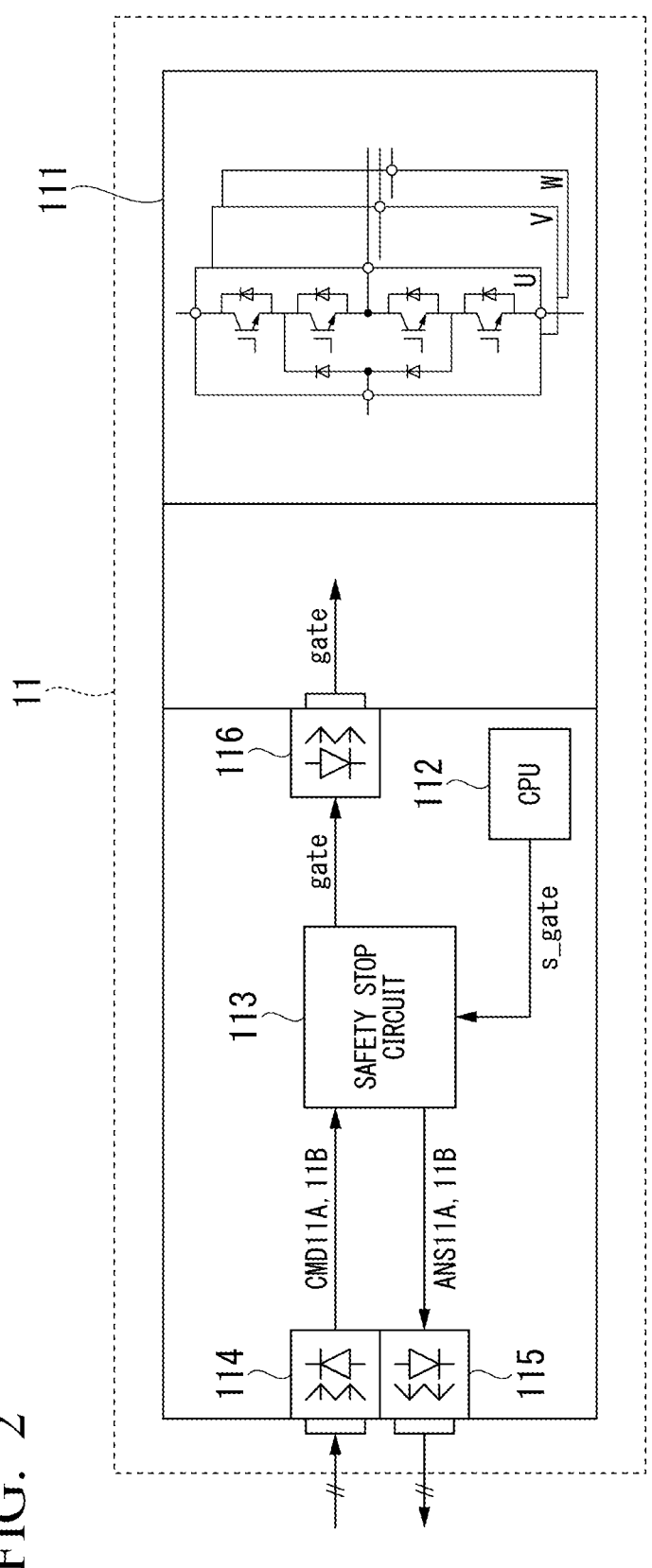
FIG. 2 is a diagram illustrating a configuration of the motor control device according to the embodiment.

FIG. 2 is a diagram illustrating the configuration of the motor control device 11 according to the embodiment. The motor control device 11 is an example of a three-level inverter that generates three-phase AC electric power. The motor control devices 12, 13, and 14 have the same configuration as the motor control device 11.

The motor control device 11 illustrated in FIG. 2 includes a main circuit unit 111, a main circuit controller 112, a safety stop circuit 113, and interface portions 114, 115, and 116.

The main circuit unit 111 includes a leg including one or more switching elements for each phase of three-phase AC currents for each phase. In the main circuit unit 111, switching of the one or more switching elements is controlled using a gate pulse (gate) which will be described later. The gate pulse (gate) is supplied when driving thereof is not limited by the safety stop circuit 113 which will be described later and supply of the gate pulse (gate) is stopped when the driving is limited by the safety stop circuit 113. The configuration of the main circuit unit 111 illustrated in FIG. 2 is an example of a three-level type, but is not limited thereto and may be other than a three-level type, for example, a two-level type or a five-level type.

The main circuit controller 112 generates a gate pulse (s_gate) for switching one or more switching elements under the control of the non-safety controller 30 and on the basis of detection results from various sensors which are not illustrated or an estimation result of a control state. Control commands from the non-safety controller 30 include, for example, control commands indicating reference values of position control, speed control, torque control, and the like. The control commands from the non-safety controller 30 to the main circuit controller 112 may be directly supplied to the main circuit controller 112 without passing through the relay unit 20.

The safety stop circuit 113 is connected to an output of the main circuit controller 112 and is supplied with a gate pulse (s_gate) from the main circuit controller 112. When predetermined conditions are satisfied, the safety stop circuit 113 activates the main circuit unit 111 to perform electric power conversion by supplying a gate pulse (gate) corresponding to the gate pulse (s_gate) to the main circuit unit 111. When the predetermined conditions are not satisfied, the safety stop circuit 113 limits supply of the gate pulse to the main circuit unit 111.

The interface portion 114 is connected to the output of the relay unit 20 and receives a signal from the relay unit 20. For example, the interface portion 114 is made to be redundant in an A-system safety torque off (STO) signal input circuit portion 114A and a B-system STO signal input circuit portion 114B.

The interface portion 115 is connected to the output of the relay unit 20 and supplies a signal from the safety stop circuit 113 to the relay unit 20. For example, the interface portion 115 is made to be redundant in an A-system output circuit portion 115A and a B-system output circuit portion 115B.

The interface portion 116 is connected to an input of the main circuit unit 111 and supplies a signal from the safety stop circuit 113 to the main circuit unit 111.

The safety stop circuit 113 is connected to the relay unit 20 as described above. For example, the safety stop circuit 113 of the motor control device 11 is controlled by the safety controller 60 via the relay unit 20. For example, the safety stop circuit 113 receives a redundant operation command CMD and transmits a redundant answer signal ANS to the safety controller 60 in response thereto. In FIG. 2, the operation commands CMD and the answer signals ANS are referred to as CMDs 11A and 11B and ANSs 11A and 11B. The CMDs 11A and 11B are signals which are redundant for each other. The ANSs 11A and 11B are signals which are redundant for each other.

The motor control device 11 illustrated in FIG. 2 has been described above. The description can also be applied to the motor control devices 12, 13, and 14.

When the outputs of the motor control devices 10 are connected to one end of a specific winding of the electric motor M together, a reactor may be provided between the output of each motor control device 10 and the one end of the specific winding of the electric motor M to curb transient generation of an overcurrent. The aforementioned description is associated with main connection, and a reactor may be provided in each connection as described above. The reactor is not illustrated in FIGS. 1A and 2. When a reactor is not necessary as described above, the reactor may be omitted as illustrated in the drawings. When a reactor is provided, a known configuration for overcurrent protection or the like may be employed.

When an operation command CMD indicating "output stop" is received from the safety controller 60 via the relay unit 20, each motor control device 10 is controlled such that outputting of AC electric power is stopped by the safety stop circuit 113. Accordingly, each motor control device 10 stops supply of AC electric power. As a result, supply of AC electric power to the windings of the electric motor M is stopped.

The relay unit 20 relays the answer signals ANS of the motor control devices 11 to 14 to the safety controller 60 which is located upstream. Accordingly, the safety controller 60 determines that functional safety control in the drive system 1 functions validly when the logic of the operation command CMD transmitted therefrom matches the logic of the answer signals ANS.

The interface portion 24 in the relay unit 20 will be described below with reference to FIG. 3 and FIG. 1B.

Figure 3:
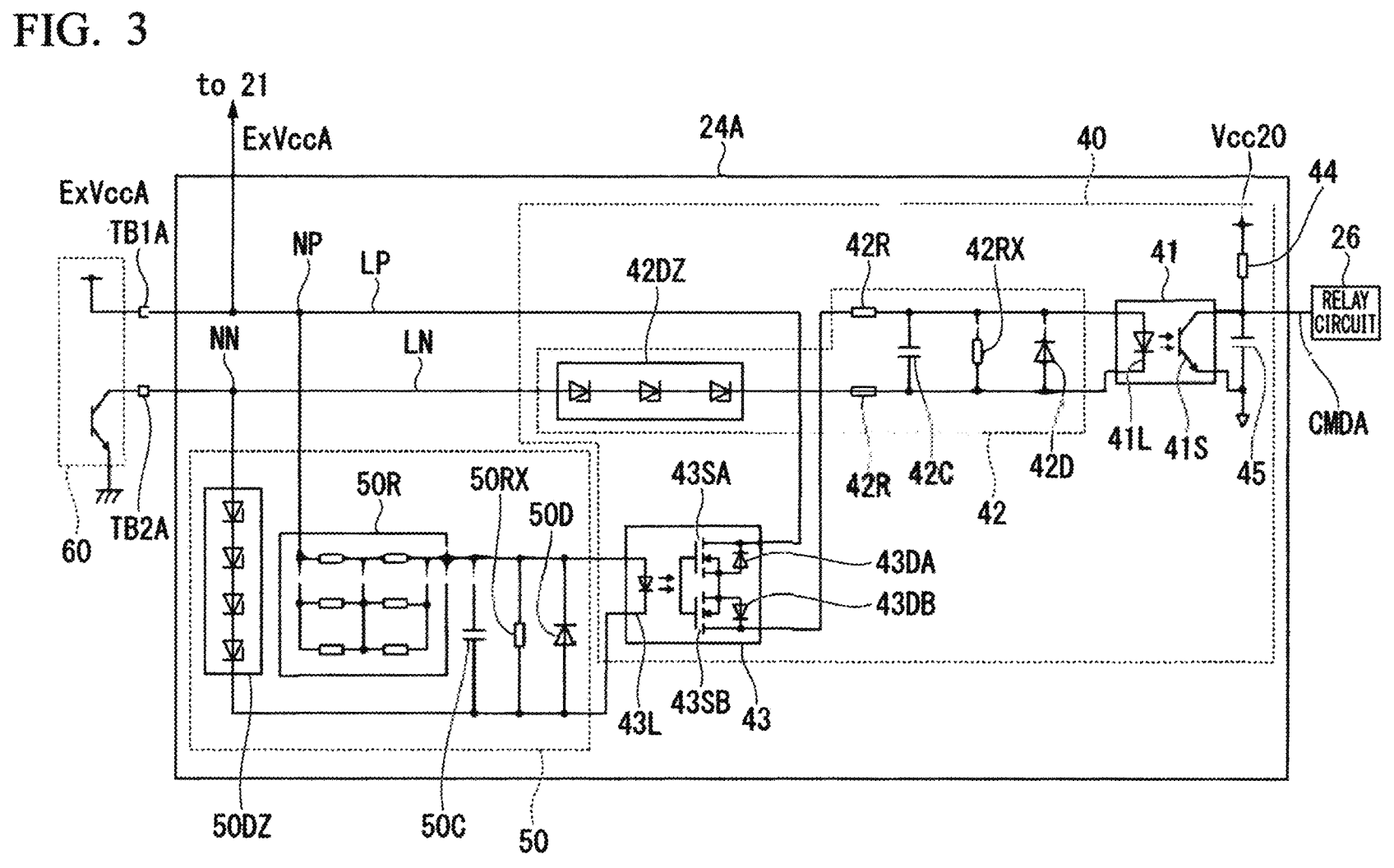

FIG. 3 is a diagram illustrating the configuration of the STO signal input circuit portion 24A included in the interface portion 24 according to the embodiment. An area of the A-system circuit (the STO signal input circuit portion 24A) is illustrated in the drawings, and the interface portion 24 includes the B-system circuit (the STO signal input circuit portion 24B) having the same configuration.

In FIG. 3, the operation command CMD is referred to as CMDA.

The STO signal input circuit portion 24A includes, for example, terminals TB1A and TB2A to which an external device is connected. The terminals TB1A and TB2A are used as input terminals of signals. A positive connection circuit LP is connected to the terminal TB1A, and a negative connection circuit LN is connected to the terminal TB2A. A voltage source of a signal supplied between the terminals TB1A and TB2A is provided on an external device (an external unit) side of the motor control device 11. The safety controller 60 is an example of the external device (the external unit) of the motor control device 11. For example, the power supply units 61A and 61B (FIG. 2) in the safety controller 60 are used as a voltage source of a signal. In this case, an A-system voltage ExVccA is input to the STO signal input circuit portion 24A. Although not illustrated in the drawing, a B-system voltage ExVccB is input to the STO signal input circuit portion 24B instead. One or both of the voltage ExVccA and the voltage ExVccB are supplied from the safety controller 60 side which is a device generally referred to as a "safety relay." Regarding the voltage ExVccA or ExVccB, even when a voltage supplied from a power supply device satisfying requirements for a safety extra-low voltage circuit (SELV circuit) is 24 V (rated voltage), the voltage may increase to 60 V at the time of occurrence of an abnormality. The interface portion 24 needs to have overvoltage tolerance for such an event. The interface portion 24 is an example of a configuration having the overvoltage tolerance. Details of the SELV circuit will be described later.

The STO signal input circuit portion 24A includes, for example, a signal identifying unit 40 and an overvoltage detecting unit 50.

The signal identifying unit 40 includes an optical isolator 41, a detection voltage setting circuit 42, a switch 43, a resistance element 44, and a capacitor 45.

The optical isolator 41 includes, for example, a light emitting element 41L constituting a primary circuit and a switch 41S constituting a secondary circuit which are formed as a photo coupler. The primary circuit and the secondary circuit of the optical isolator 41 are electrically isolated from each other. When an electrical signal supplied via the terminals TB1A and TB2A to which an external device is connected is detected, the primary circuit of the optical isolator 41 outputs a logical signal corresponding to the detection result from the secondary circuit in response to the detection. In the configuration example illustrated in FIG. 3, the light emitting element 41L includes an LED, and the switch 41S includes a transistor. For example, the secondary circuit of the optical isolator 41 is provided as an open-collector output type with a grounded emitter. An output terminal of the secondary circuit of the optical isolator 41 is pulled up to a DC voltage Vcc20 by the resistance element 44, and a noise reduction filter circuit using the capacitor 45 is provided. For example, the logic of signals can be prescribed such that a device operation permission command is acquired when the photo coupler operates to turn on (make) the switch 41S and a device stop command is acquired when the switch 41S is turned off (break) in a state in which the photo coupler is not operating.

The detection voltage setting circuit 42 sets a voltage to which the LED of the primary circuit of the optical isolator 41 responds. For example, the detection voltage setting circuit 42 includes a constant-voltage circuit 42DZ (a first constant-voltage circuit), a first impedance element 42R, a shunt resistor 42RX, a reverse bias protection element 42D, and a capacitor 42C.

The constant-voltage circuit 42DZ (the first constant-voltage circuit) is a constant-voltage diode for prescribing an insensible voltage range of the primary circuit of the optical isolator 41. A number of elements corresponding to the insensible voltage range may be arranged in series. For example, the constant-voltage circuit 42DZ is disposed in the negative connection circuit LN and is provided on the terminal TB2A side out of the elements constituting the signal identifying unit 40.

The first impedance element 42R includes, for example, one or more resistors. The first impedance element 42R limits a current in the primary circuit of the optical isolator 41. More specifically, the first impedance element 42R limits a current which is generated when a forward voltage exceeding the insensible voltage range of the primary circuit of the optical isolator 41 is applied across the terminals TB1A and TB2A and a current which is generated when a reserve voltage for reversely biasing the primary circuit of the optical isolator 41 is applied thereto. In the example illustrated in FIG. 3, the first impedance element 42R is divided into two parts, of which are provided in the positive connection circuit LP and the negative connection circuit LN, respectively.

The shunt resistor 42RX shunts a part of a current flowing in the first impedance element 42R to flow, for example, when a voltage exceeding the insensible voltage range of the primary circuit of the optical isolator 41 is applied across the terminals TB1A and TB2A.

The reverse bias protection element 42D is, for example, a diode and protects the primary circuit of the optical isolator 41 from being reversely biased.

The capacitor 42C serves as a filter, and a cutoff frequency or a time constant is determined in combination with the first impedance element 42R or the like.

The shunt resistor 42RX, the reverse bias protection element 42D, and the capacitor 42C are connected via the connection circuit LP and the connection circuit LN.

The detection voltage setting circuit 42 is provided closer to the primary circuit of the optical isolator 41 than the switch 43 and is connected in parallel to the primary circuit of the optical isolator 41.

The switch 43 includes, for example, an optically isolated MOSFET. The switch 43 may be referred to as a photo MOSFET. The switch 43 illustrated in FIG. 3 includes a group of a first MOSFET 43SA and a second MOSFET 43SB connected in series, a first diode 43DA which is connected in antiparallel to the first MOSFET 43SA, and a second diode 43DB which is connected in antiparallel to the second MOSFET 43SB. The sources of the first MOSFET 43SA and the second MOSFET 43SB are connected to each other and the gates thereof are connected to each other. As a result of series connection described above, the drains of the first MOSFET 43SA and the second MOSFET 43SB serve as two electrodes of the switch 43. For example, when the first MOSFET 43SA is turned on, a current flows in a path passing through the first MOSFET 43SA and the second diode 43DB. When the second MOSFET 43SB is turned on, a current flows in a path passing through the second MOS-FET 43SB and the first diode 43DA. When the two MOS-FETs are turned on together, a current flows in two directions on the secondary side of the switch 43. Accordingly, when the switch 43 is turned on, a current flows in the primary circuit of the optical isolator 41.

In the configuration of the switch 43, the switch 43 may be configured to include the first MOSFET 43SA and the second diode 43DB. In this case, in the arrangement illustrated in FIG. 3, the drain of the first MOSFET 43SA is disposed to face the terminal TB1A, and the cathode of the second diode 43DB is disposed to face the optical isolator 41. With this configuration, it is possible to cause a current to flow from the terminal TB1A to the optical isolator 41.

The switch 43 is formed as a so-called "brake contact (b contact)" type switch in combination of semiconductor elements. The switch 43 is turned on when there is no control signal for the switch 43 generated by the overvoltage detecting unit 50 which will be described later and is turned off when there is a control signal for the switch 43. The state in which there is no control signal for the switch 43 corresponds to a state in which a current does not flow in the primary circuit of the switch 43 or a state in which the primary circuit does not respond, and corresponds to a normal state in this embodiment. The state in which there is a control signal for the switch 43 corresponds to a state in which a current with a magnitude to which the primary circuit of the switch 43 responds flows and corresponds to an overvoltage state in this embodiment.

As described above, the switch 43 is provided in the connection circuit LP between the terminal TB1A and the detection voltage setting circuit 42 and is normally turned on.

The overvoltage detecting unit 50 detects a voltage of a position closer to the terminal TB1A than the switch 43 (the optically isolated MOSFET). A node NP of the connection circuit LP is provided in the connection circuit LP between the terminal TB1A and the switch 43. A node NN of the connection circuit LN is provided in the connection circuit LN between the terminal TB2A and the detection voltage setting circuit 42. An input terminal of the overvoltage detecting unit 50 is connected to the node NP and the node NN and detects a voltage applied across the connection circuit LP and the connection circuit LN. The overvoltage detecting unit 50 having the aforementioned configuration generates a signal for controlling the switch 43 such that an overvoltage applied to the primary circuit of the optical isolator 41 is limited.

A voltage which is set in the overvoltage detecting unit 50 to limit an overvoltage is different from the voltage which is set in the detection voltage setting circuit 42 to identify whether or not a signal.

For example, the overvoltage detecting unit 50 includes a constant-voltage circuit 50DZ (a second constant-voltage circuit), a second impedance element 50R, a shunt resistor 50RX, and a reverse bias protection element 50D.

The constant-voltage circuit 50DZ (the second constant-voltage circuit) is a constant-voltage diode. A breakdown voltage of the constant-voltage diode is determined on the basis of an allowable input voltage range of the primary circuit of the optical isolator 41. The constant-voltage circuit is a constant-voltage diode in which a total value of the breakdown voltages is prescribed. In the constant-voltage circuit 50DZ (the second constant-voltage circuit), a number of elements corresponding to the allowable input voltage range may be arranged in series.

The second impedance element 50R includes, for example, a resistor. The second impedance element 50R limits a current in the primary circuit of the switch 43. More specifically, the second impedance element 50R limits a current which is generated when a forward voltage exceeding the insensible voltage range of the primary circuit of the switch 43 is detected and a current which is generated when a reserve voltage for reversely biasing the primary circuit of the switch 43 is applied.

The shunt resistor 50RX shunts a part of a current flowing in the second impedance element 50R to flow when a voltage exceeding the allowable input voltage range of the primary circuit of the switch 43 is applied across the terminals TB1A and TB2A.

The reverse bias protection element 50D is, for example, a diode and protects the primary circuit of the optical isolator 41 from being reversely biased.

The capacitor 50C serves as a filter, and a cutoff frequency or a time constant is determined in combination with the second impedance element 50R or the like.

The switch 43 is provided between the detection voltage setting circuit 42 and the group of the nodes NP and NN of the overvoltage detecting unit 50 via the connection circuit LP.

The STO signal input circuit portion 24A includes the aforementioned elements.

Figure 4:
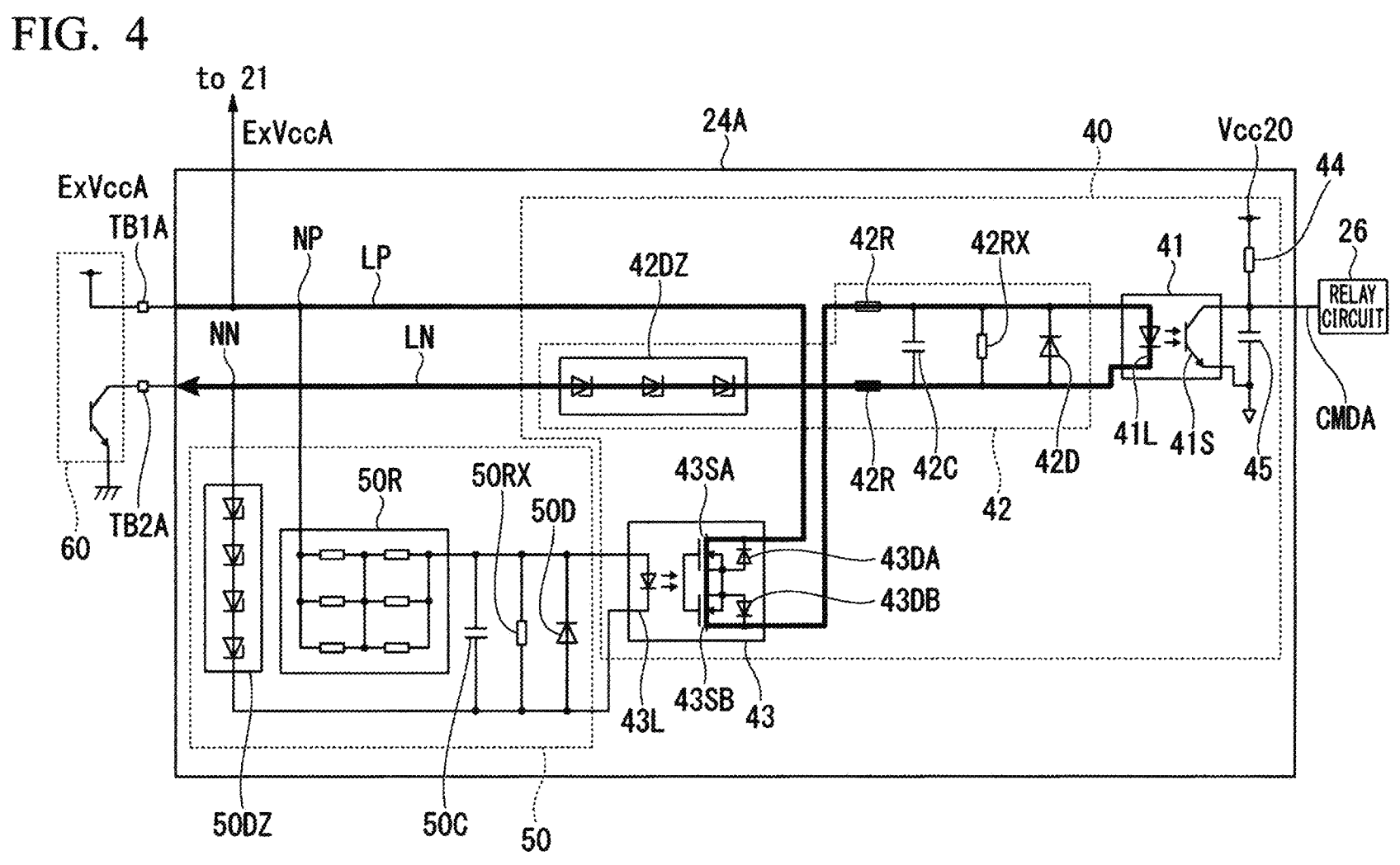

A more specific application of the STO signal input circuit portion 24A illustrated in FIG. 3 and details of the constituents of the STO signal input circuit portion 24A will be described below. FIG. 4 is a diagram illustrating an STO signal in the configuration illustrated in FIG. 3. A bold arrow in FIG. 4 indicates a path in which a main current associated with an STO signal flows.

(Forward Current in Primary Circuit of Switch 43)

A forward current in the primary circuit of the switch 43, which is referred to as a current IF and so on, will be described below. The forward current in the primary circuit of the switch 43 is an example of a main current associated with an STO signal.

For example, an external device such as the relay unit 20 includes a DC power supply. A signal from the external device can be supplied with the amplitude based on an output voltage of the DC power supply. Influences of an impedance of the power supply device and an impedance of a connection line are ignored herein.

It is assumed that a rated output voltage of a power supply device is a DC voltage of 24 V. A voltage value represents a DC voltage unless otherwise mentioned. This is true in the following description.

An upper limit of a fluctuation range of a voltage is determined 110% on the basis of the rated output voltage. A margin of 5% is provided with respect to the upper limit. Accordingly, a voltage up to a voltage (27.6 V) which is 1.15 times the rated output voltage (24 V) is permitted, and a voltage higher than the voltage is defined as an overvoltage. When an overvoltage is applied across the terminals TB1A and TB2A, it is prescribed that there is a certain reason for the overvoltage. Therefore, constants of the constituents are determined on the basis of the voltage (27.6 V) such that a current IF starts flowing in the primary circuit of the switch 43.

For example, four constant-voltage diodes with a breakdown voltage of 6.8 V are connected in series. A forward voltage VF when a current IF flows in the primary circuit of the switch 43 is set to 1.15 V. When a voltage equal to or greater than a voltage represented by Expression (1) is observed, the constant-voltage diodes are turned on and the current IF starts flowing in the switch 43.

$$6.8 \text{ V} \times 4 + 1.15 \text{ V} = 28.35 \text{ V} \tag{1}$$

(Operation Start Point of Primary Circuit of Switch 43)

An approximate value of the voltage at which the current IF starts flowing is set to 30 V. An operating point of the primary circuit of the switch 43 is determined on the basis of a recommended operation range of the current IF in the switch 43.

A maximum voltage of the primary circuit of the switch 43 is determined on the basis of a maximum output voltage of power supply devices in the market. For example, the maximum voltage of the primary circuit of the switch 43 is set to 60 V which is the same as the maximum output voltage of the power supply devices.

For example, 45 V which is an average value of 30 V and 60 V is determined to be a threshold voltage. When the threshold voltage is exceeded, the switch 43 is switched to an off state. When the threshold voltage is applied across the terminals TB1A and TB2A, circuit constants can be determined such that the current IF to which the primary circuit of the switch 43 can respond flows. An example thereof will be described below using Expression (2).

$$\left(45 \text{ V} - 6.8 \text{ V} \times 4 + 1.15 \text{ V}/\left(4.7 \text{ k}\Omega \times 2/3\right) - 1.15 \text{ V}/4.7 \text{ k}\Omega = 5.6 \text{ mA} \quad (2)$$

Regarding conditions of 45 V corresponding to the threshold voltage, the current value (5.6 mA) is greater than a lower limit (5 mA) of the current IF, which satisfies a condition that the LED is turned on. Regarding conditions of 60 V, since the current value is 10.4 mA and is not greater than the upper limit (50 mA) of the current IF in the primary circuit of the switch 43, a condition that the LED in the switch 43 does not damage due to self-heating in an ON state or the like is satisfied.

(Verification in Examples of Constituents)

(1) Verification of Maximum Value of Current IF in Primary Circuit of Switch 43

A voltage value when a source voltage (24 V) is an abnormal value is assumed to be 60 V on the basis of a rated value of the circuit. In this case, a condition that the current IF is not greater than an allowable maximum rated current value in the primary circuit of the switch 43 is satisfied as described above.

(2) Verification of Loss in Constant-Voltage Circuit 50DZ

A relationship between a current (10.4 mA) flowing in the constant-voltage circuit 50DZ and the breakdown voltage (6.8 V) is expressed by Expression (3). The loss at this time is estimated to be 70 mW from the result of Expression (3). Therefore, the condition can be satisfied by selecting components of which an allowable maximum loss is 300 mW.

$$10.4 \text{ mA} \times 6.8 \text{ V} = 70 \text{ mW} \quad (3)$$

An influence of heating in the constant-voltage circuit 50DZ will be verified below.

When the constant-voltage circuit 50DZ is used in an environment in which an ambient temperature is 60° C., elements of which thermal resistance of a package is 416 K/W are distributed. When a loss of 70 mW occurs in an element in a package with such thermal resistance, an increase in junction temperature ($\Delta$T) is 29.4 K as expressed by Expression (4). By adding the ambient temperature 60° C. thereto, the junction temperature is 89.4° C. At this temperature, an allowable upper limit at a general junction temperature of semiconductor is not exceeded. It can be seen from analysis results of the temperature that continuous tolerance is sufficient even when a time in which heating is continuously maintained is extended.

$$\Delta T = 70 \text{ mW} \times 416 \text{ K/W} = 29.4 \text{ K} \rightarrow 89.4° \text{ C.} @60° \text{ C.} \quad (4)$$

(3) Verification of Loss in Second Impedance Element 50R

A loss in the second impedance element 50R is verified for each resistance element constituting the second impedance element 50R.

As described above, the second impedance element 50R has a configuration in which a group of three resistance elements connected in parallel and another group of three resistance elements connected in parallel are connected in series. Accordingly, a current flowing in each resistance element is 1/3 of a current flowing in the second impedance element 50R. On the basis thereof, a loss in each resistance element is 56 mW as expressed by the following expression. Accordingly, when an element with a rated loss of 1/4 W is employed, the total loss is less than 23% of the rated loss even in continuous operation.

$$\left(10.4 \text{ mA}/3\right)^2 \times 4.7 \text{ k} = 56 \text{ mW} \quad (5)$$

A voltage applied across the shunt resistor 42RX and the reverse bias protection element 42D is apparently relatively low even unless being analyzed. Although description thereof will be omitted, a loss can be calculated using a known method and components permitting such a loss can be selected.

(Operations and Advantages of Switch 43 being Provided)

Operations and advantages of the switch 43 being provided will be first described below.

The switch 43 is of a normally on type. Accordingly, the switch 43 is normally in the on state.

When a voltage equal to or greater than a predetermined threshold voltage is applied across the terminals TB1A and TB2A, the overvoltage detecting unit 50 detects the voltage and operates to turn off the switch 43. For example, a situation in which a voltage equal to or greater than a predetermined threshold voltage is applied to the primary circuit of the optical isolator 41 and the detection voltage setting circuit 42 will be described below. Even when such a situation occurs, it is possible to cut off an overvoltage by turning off the switch 43. Accordingly, it is possible to limit continuous application of an overvoltage to the primary circuit of the optical isolator 41 and the detection voltage setting circuit 42 over a relatively long period.

An influence of a defect which has occurred in the switch 43 and peripherals thereof will be described below. Defect modes of the switch 43 and the peripherals thereof will be described below and sequentially.

(1) First Mode in which Current Flowing in Switch 43 is Lost Due to Erroneous Operation When a current flowing in the switch 43 is lost due to an erroneous operation based on a certain reason, the current IF flowing in the primary circuit of the optical isolator 41 is lost together. By defining the logic of signals such that the logic of a signal in such a situation is equivalent to the device stop command, the electric motor M is stopped when the first mode occurs. A typical reason thereof is loss of the voltage ExVccA (voltage ExVccB) from the power supply unit 61A (61B) provided in an external device or the like.

(2)-1 Second Mode Based on Defect of Primary Circuit of the Optical Isolator 41 and Peripheral Circuits When a defect of a short mode occurs in the primary circuit (between the input terminals) of the optical isolator 41 and peripheral circuits thereof, the current IF flowing in the primary circuit of the optical isolator 41 is lost. This event is the same as in the first mode and can be correlated with the device stop command.

(2)-2 Third Mode Based on Defect of Primary Circuit of Optical Isolator 41 and Peripheral Circuits When a defect of an open mode occurs in the primary circuit (between the input terminals) of the optical isolator 41 and the peripheral circuits thereof, the current IF flowing in the primary circuit of the optical isolator 41 is lost. This event causes the same result as in the first mode. Occurrence of the third mode does not affect the operation of the switch 43.

(2)-3 Fourth Mode Based on Defect of Secondary Circuit of Optical Isolator 41 and Peripheral Circuits When a defect of the short mode occurs in the secondary circuit (between the output terminals) of the optical isolator 41 and the peripheral circuits thereof, the current IF flowing in the primary circuit of the optical isolator 41 is lost. This event causes the same result as in the first mode. Occurrence of the fourth mode does not affect the operation of the switch 43.

(2)-4 Fifth Mode Based on Defect of Secondary Circuit of Optical Isolator 41 and Peripheral Circuits When a defect of the open mode occurs in a secondary circuit (between the output terminals) of the optical isolator 41 and the peripheral circuits thereof, the current IF flowing in the primary circuit of the optical isolator 41 is lost. This event causes the same result as in the first mode.

(3) In the Second and Third Modes, an Unapparent Obstacle Occurs.

By adding check of occurrence of the second and third modes to check items of periodic diagnosis, the unapparent obstacle can be avoided.

As described above, loss of functions associated with STO is not caused by providing the switch 43 and peripheral circuits thereof.

An example of a configuration of the signal identifying unit 40 when the switch 43 and the overvoltage detecting unit 50 associated therewith are provided will be described below.

According to an aspect of the embodiment, the thermal load of the signal identifying unit 40 according to the embodiment is decreased in comparison with a comparative example in which the switch 43 and the overvoltage detecting unit 50 are not provided. Since the signal identifying unit 40 corresponds to a main path of signals associated with safety functions as illustrated in FIG. 4, the decrease of the thermal load of the signal identifying unit 40 causes enhancement in reliability. An example thereof will be described below.

An example of electrical specifications of the constituents will be first described below.

Forward voltage VF on the primary side of the optical isolator 41: 1.25 V

Allowable maximum current $\text{IF}_{MAX}$ on the primary side of the optical isolator 41: 50 mA Total value of breakdown voltages of constant-voltage circuit 42DZ: 4.7 V×3, three elements of 4.7 V are connected in series Allowable maximum loss of elements in constant-voltage circuit 42DZ: 300 mW Total value of impedance of first impedance element 42R: 360Ω×2, two elements of 360Ω are connected in series Impedance of shunt resistor 42RX: 1 kΩ

Allowable maximum loss of reverse bias protection element 42D: 300 mW

Results of thermal analysis of the current IF of the optical isolator 41 and the peripheral circuits thereof will be described below.

(1)-1 Current IF of Optical Isolator 41

The current IF of the optical isolator 41 when the voltage ExVccA of the external power supply unit 61A is 24 V which is a steady-state voltage (in a normal state) is calculated to be 13.26 mA using Expression (6).

$$(24 \text{ V} - 1.25 \text{ V} - 4.7 \text{ V} \times 3)/360\Omega \times 2 + 1.25 \text{ V}/1 \text{ k}\Omega = 13.26 \text{ mA} \quad (6)$$

Operating Point of Constant-Voltage Circuit 42DZ

A voltage equal to or greater than half the steady-state voltage (24 V) is set as a threshold voltage and an operating point is set such that the constant-voltage circuit responds to a voltage greater than the threshold voltage. For example, when a signal exceeding the voltage calculated using Expression (7) is detected, flowing of a current IF in the optical isolator 41 starts.

$$1.25 \text{ V} + 4.7 \text{ V} \times 3 = 15.35 \text{ V} \quad (7)$$

Losses in Constituents in Abnormal State in which Signal Voltage is Higher than Steady-State Voltage (24 V)

It is assumed that a voltage which is not determined to be an overvoltage by the overvoltage detecting unit 50 is a maximum voltage of a voltage applied to the optical isolator 41. In this case, the voltage is 45 V. When the voltage of 45 V is applied across the terminals TB1A and TB2A, the current IF of the optical isolator 41 is a maximum value. An external contact current determined according thereto is calculated using Expression (8).

$$(45 \text{ V} - 1.25 \text{ V}) - 4.7 \text{ V} \times 3/360\Omega \times 2 + 1.25 \text{ V}/1 \text{ k}\Omega = 42.43 \text{ mA} \quad (8)$$

The current IF of the optical isolator 41 is calculated using Expression (9).

$$42.43 \text{ mA} - 1.25 \text{ V}/1 \text{ k}\Omega = 41.18 \text{ mA} \quad (9)$$

Accordingly, it can be seen that the current IF in the optical isolator 41 is 41.18 mA and is less than the allowable maximum current value (50 mA).

Loss in First Impedance Element 42R

The loss in the first impedance element 42R is calculated using Expression (10).

$$(42.43 \text{ mA})^2 \times 360 = 0.65 \text{ W} \quad (10)$$

For example, an element with an allowable loss of 1 W which is greater than the loss 0.65 W is selected as the first impedance element 42R. In this case, derating associated with the loss in the first impedance element 42R is 65%.

Loss in Element of Constant-Voltage Circuit 42DZ

Losses of elements of the constant-voltage circuit 42DZ are calculated using Expression (11).

The loss in the constant-voltage circuit 42DZ is 194 mW on the basis of the relationship between the current (42.43 mA) flowing in the constant-voltage circuit 42DZ and the breakdown voltage (4.7 V). Therefore, this condition can be satisfied by selecting components with an allowable maximum loss of 300 mW as the constant-voltage circuit 42DZ.

$$42.43 \text{ mA} \times 4.7 \text{ V} = 194 \text{ mW} \qquad (11)$$

Verification of an influence of heating will be described below. An increase in junction temperature (ΔT) is 80.7 K from Expression (12). The junction temperature when it is assumed that the ambient temperature is 60° C. is 140.7° C. Accordingly, even when the ambient temperature is assumed to be 60° C., of the junction temperature is equal to or lower than an allowable upper limit (150° C.) thereof.

$$\Delta T = 194 \text{ mW} \times 416 \text{ K/W} = 80.7 \text{ K} \rightarrow 140.7° \text{ C.}@60° \text{ C.} \qquad (12)$$

Results of analysis of a dielectric withstanding voltage of the optical isolator 41 will be described below.

(1)-2 Dielectric Withstanding Voltage of Optical Isolator 41

For example, a normally on type photo MOSFET is used as the switch 43 associated therewith. It is an example of an optically isolated MOSFET.

In a normal state in which the current IF of the switch 43 does not flow, the switch 43 is in the on state and thus an external signal reaches the primary side of the optical isolator 41. On the other hand, in an abnormal state in which the current IF of the switch 43 flows, the switch 43 is in the off state and thus an external signal does not reach the primary side of the optical isolator 41.

Therefore, it is assumed that the dielectric withstanding voltage of the optical isolator 41 is verified in the "state in which an external signal reaches the primary side" in the former. A maximum voltage of an external power supply is assumed to be 60 V. In this case, the dielectric withstanding voltage of the optical isolator 41, that is, a withstanding voltage of the output side of the optical isolator 41, can be equal to or greater than 60 V. This value is in a range in which photo MOSFETs in the market are applicable.

Validity of the example of the signal identifying unit 40 can be ascertained from the results of analysis.

According to the embodiment, the signal identifying unit 40 includes the optical isolator 41 that converts an electrical signal which is supplied via the terminals TB1A and TB2A to which an external device is connected. The signal identifying unit 40 further includes the switch 43 that turns off the connection circuit LP from the terminal TB1A to the primary side of the optical isolator 41. The overvoltage detecting unit 50 is configured to turn off the switch 43 when a voltage applied across the connection circuits LP and LN is greater than the threshold voltage. Accordingly, overvoltage resistance of the signal identifying unit 40 that identifies an STO signal associated with functional safety is enhanced.

Reliability of the STO signal input circuit portion 24A will be described below with reference to FIG. 4.

The collector of a transistor of the optical isolator 41 in the STO signal input circuit portion 24A is connected to the power supply unit 21 (voltage Vcc20) in the relay unit 20 via the resistance element 44. The optical isolator 41 is driven by on/off control of the transistor. When the transistor is switched to the on state, the optical isolator 41 is switched to an active (make) state and thus a device operation permission command is generated. When the transistor is switched to the off state, the optical isolator 41 is switched to an inactive (break) state and thus a device stop command is generated.

As described above, a path along a bold arrow in FIG. 4 is a path in which a main current associated with an STO signal flows. In this way, a component affecting reliability of a safety circuit is disposed in the path indicated by the arrow in FIG. 4. This path includes the signal identifying unit 40 but does not include the overvoltage detecting unit 50. Even when a single defect state (short or open) occurs in a component of the overvoltage detecting unit 50 during operation under normal operating conditions as described above, a mode in which the STO signal is cut off does not occur.

In this point of view, the signal identifying unit 40 including the switch 43 is included as an object of reliability analysis as a safety circuit. By arranging the signal identifying unit 40 and the overvoltage detecting unit 50 with an appropriate gap, the overvoltage detecting unit 50 which is separated from the path of the arrow cannot be included as the object.

In a comparative example which is different from this embodiment, the number of impedance elements 42R according to the comparative example constituting parallel connection may be larger than that in the configuration example of the embodiment. An increase in failure rate due to an increase in the number of components affects reliability analysis of a safety circuit accompanied therewith, and the reliability may decrease due to the increase in failure rate. In a safety circuit, a margin with respect to an allowable value of an input current of the light emitting element 41L is required to satisfy desired conditions. It is not easy to construct a safety circuit satisfying these requirements.

With the drive system 1 having the configuration according to this embodiment, it is possible to satisfy the requirements and to curb the increase in failure rate of the components of the overvoltage detecting unit 50 within a minute range. Accordingly, it is possible to construct the drive system 1 that can reduce an influence on reliability analysis of a safety circuit.

Application to a safety extra-low voltage circuit (referred to as an SELV circuit) will be described below.

In the IEC standard, there are prescriptions for a limit value of an electric energy source. For example, a source voltage is defined as a limit value of a steady-state voltage.

A source voltage of the SELV circuit is defined as a voltage "which is protected by a structure in which a potential difference between a part which can be touched by a user and a safety earth is not a dangerous voltage and in which a line voltage or a potential difference from the earth is equal to or less than a peak value 42.4 V and a DC voltage 60 V."

With this configuration, a power supply device with a steady-state voltage 24 V for the SELV circuit is assumed and an output voltage of the power supply device is assumed to be applied up to a maximum DC voltage 60 V.

With the configuration described above in the embodiment, validity at the time of application of 60 V is ascertained. Accordingly, the motor control devices 11 to 14 according to the embodiment permit the power supply device for the SELV circuit to be applied to the power supply units 61A and 61B.

In general, an overvoltage when a power supply fails does not stay at an intermediate voltage but instantly reaches an upper limit of an overvoltage. For example, in the power supply device with a steady-state voltage 24 V for the SELV circuit, 60 V which is the upper limit much greater than an intermediate voltage of about 45 V can be applied. In the heating amount analysis at 45 V described above in the embodiment, this condition (application of 45 V) causes a maximum loss. When the voltage further increases, the switch 43 is turned off in response to the voltage to break circuits and thus subsequent circuits thereof are protected from an overvoltage. Accordingly, when a maximum value of the overvoltage is applied, the components do not generate excessive heat and it is possible to safely stop the drive system.

According to at least one of the aforementioned embodiments, the motor control device includes a signal identifying unit and an overvoltage detecting unit. The signal identifying unit includes an optical isolator that converts an electrical signal supplied via a terminal to which an external device is connected and a switch that turns off a connection circuit connected to the terminal. The overvoltage detecting unit is configured to turn off the switch when a voltage applied to the connection circuit is greater than a threshold voltage. Accordingly, with the motor control device, it is possible to enhance overvoltage resistance of the signal identifying unit configured to identify a signal associated with functional safety.

While some embodiments of the present invention have been described above, these embodiments are presented as only examples, and are not intended to limit the scope of the present invention. These embodiments can be modified in various other forms and can be subjected to various omissions, replacements, and alterations without departing from the gist of the present invention. The embodiments and the modifications thereof are included in the scope or the gist of the present invention and are also included in the scope equivalent to the inventions described in the appended claims.

REFERENCE SIGNS LIST

1 Drive system
10, 11, 12, 13, 14 Motor control device
20 Relay unit
30 Non-safety controller
40 Signal identifying unit
41 Optical isolator
42 Detection voltage setting circuit
43 Switch
50 Overvoltage detecting unit
60 Safety controller
22, 23, 24, 25, 27, 28, 114, 115, 116 Interface portion
24A, 24B. 114A, 114B STO signal input circuit portion
26 Relay circuit

The invention claimed is:

1. A motor control device comprising:
a signal identifying unit including an optical isolator that converts an electrical signal supplied via a terminal to which an external device is connected and a switch that opens a connection circuit connected to the terminal; and
an overvoltage detecting unit configured to turn off the switch when a voltage applied to the connection circuit is greater than a threshold voltage,
wherein the signal identifying unit further includes a detection voltage setting circuit that is provided closer to the optical isolator than the switch and connected in parallel to a primary circuit of the optical isolator.

2. The motor control device according to claim 1, wherein the switch is switched to an on state when there is no control signal for the switch generated by the overvoltage detecting unit and is switched to an off state when there is a control signal for the switch.

3. The motor control device according to claim 1, wherein the signal identifying unit includes a detection voltage setting circuit that sets a voltage to which a primary circuit of the optical isolator responds, and
wherein the switch is provided in the connection circuit between the terminal and the detection voltage setting circuit.

4. The motor control device according to claim 1, wherein the switch is an optically isolated MOSFET that is connected in series to a primary circuit of the optical isolator.

5. The motor control device according to claim 1, wherein the detection voltage setting circuit includes:
a first constant-voltage circuit that defines an insensible voltage range of a primary circuit of the optical isolator; and
a first impedance element for limiting a current of the primary circuit of the optical isolator.

6. The motor control device according to claim 1, wherein the overvoltage detecting unit includes:
a second constant-voltage circuit that defines the threshold voltage; and
a second impedance element for limiting a current which is generated with a voltage greater than the threshold voltage.

7. The motor control device according to claim 1, wherein the switch includes an optically isolated MOSFET, and
wherein the overvoltage detecting unit detects a voltage which is generated during voltage limitation at a position closer to the terminal than the optically isolated MOSFET.

8. The motor control device according to claim 1, wherein the signal identifying unit includes:
the optical isolator configured to cause a primary circuit to detect an electrical signal supplied via the terminal to which the external device is connected and to cause a secondary circuit to output a logical signal corresponding to the result of detection;
a detection voltage setting circuit configured to limit a voltage which is applied to the primary circuit; and
the switch that is provided to open or close a connection circuit between the terminal to which the external device is connected and the primary circuit in accordance with a control signal.

9. A motor control method that is performed by a motor control device in which an optical isolator that converts an electrical signal supplied via a terminal to which an external device is connected and a switch that turns off a connection circuit connected to the terminal are provided, the motor control method comprising:
detecting using a voltage setting circuit that is provided closer to the optical isolator than the switch and connected in parallel to a primary circuit of the optical isolator, and
turning off the switch when the voltage applied to the connection circuit is greater than a threshold voltage.

* * * * *